United States Patent [19]
Yonezawa

[11] Patent Number: 5,478,293
[45] Date of Patent: Dec. 26, 1995

[54] AUTOMATIC TRANSMISSION CONTROL SYSTEM FOR MOTOR VEHICLE

[75] Inventor: Shirou Yonezawa, Hyogo, Japan

[73] Assignee: Mitsubishi Denki Kabushiki Kaisha, Tokyo, Japan

[21] Appl. No.: 215,702

[22] Filed: Mar. 22, 1994

[30] Foreign Application Priority Data

Mar. 23, 1993 [JP] Japan .................................. 5-063805
Oct. 14, 1993 [JP] Japan .................................. 5-256894

[51] Int. Cl.⁶ ................................................ B60K 41/04
[52] U.S. Cl. ...................... 477/110; 477/107; 477/121
[58] Field of Search ........................ 477/97, 107, 109, 477/110, 121, 80

[56] References Cited

U.S. PATENT DOCUMENTS

| | | | |
|---|---|---|---|
| 4,843,915 | 7/1989 | Sugimura et al. | 477/80 |
| 5,079,705 | 1/1992 | Sakai et al. | 477/121 X |
| 5,162,997 | 11/1992 | Takahashi | 477/107 X |
| 5,287,773 | 2/1994 | Nakawaki et al. | 477/110 X |
| 5,323,318 | 6/1994 | Hasegawa et al. | 477/97 X |

FOREIGN PATENT DOCUMENTS

| | | |
|---|---|---|
| 1227828 | 9/1989 | Japan . |
| 491332 | 3/1992 | Japan . |

Primary Examiner—Rodney H. Bonck
Assistant Examiner—Peter Kwon
Attorney, Agent, or Firm—Sughrue, Mion, Zinn, Macpeak & Seas

[57] ABSTRACT

In an automatic transmission control system, the throttle opening of a throttle valve is adjusted in accordance with the acceleration opening of an accelerator pedal, a gear is determined on the basis of the adjusted throttle opening and the rotation speed of the output shaft of an automatic transmission, and the throttle opening is prohibited from following a variation of the acceleration opening during a gear shifting operation. The complexity of the gear shift control is thereby reduced, and the gear shift shock caused when a driver depresses an accelerator pedal during the gear shift is prevented.

9 Claims, 12 Drawing Sheets

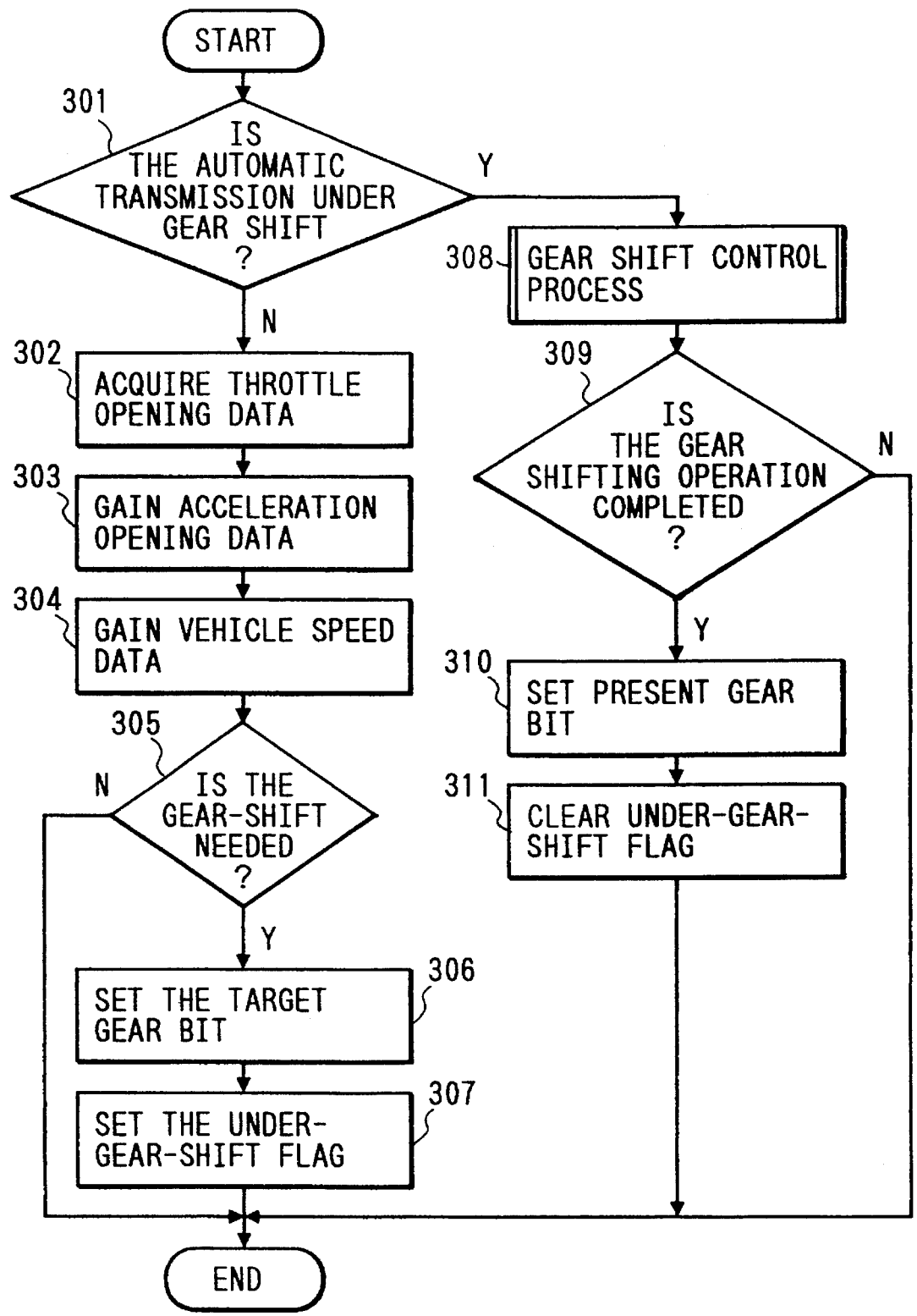

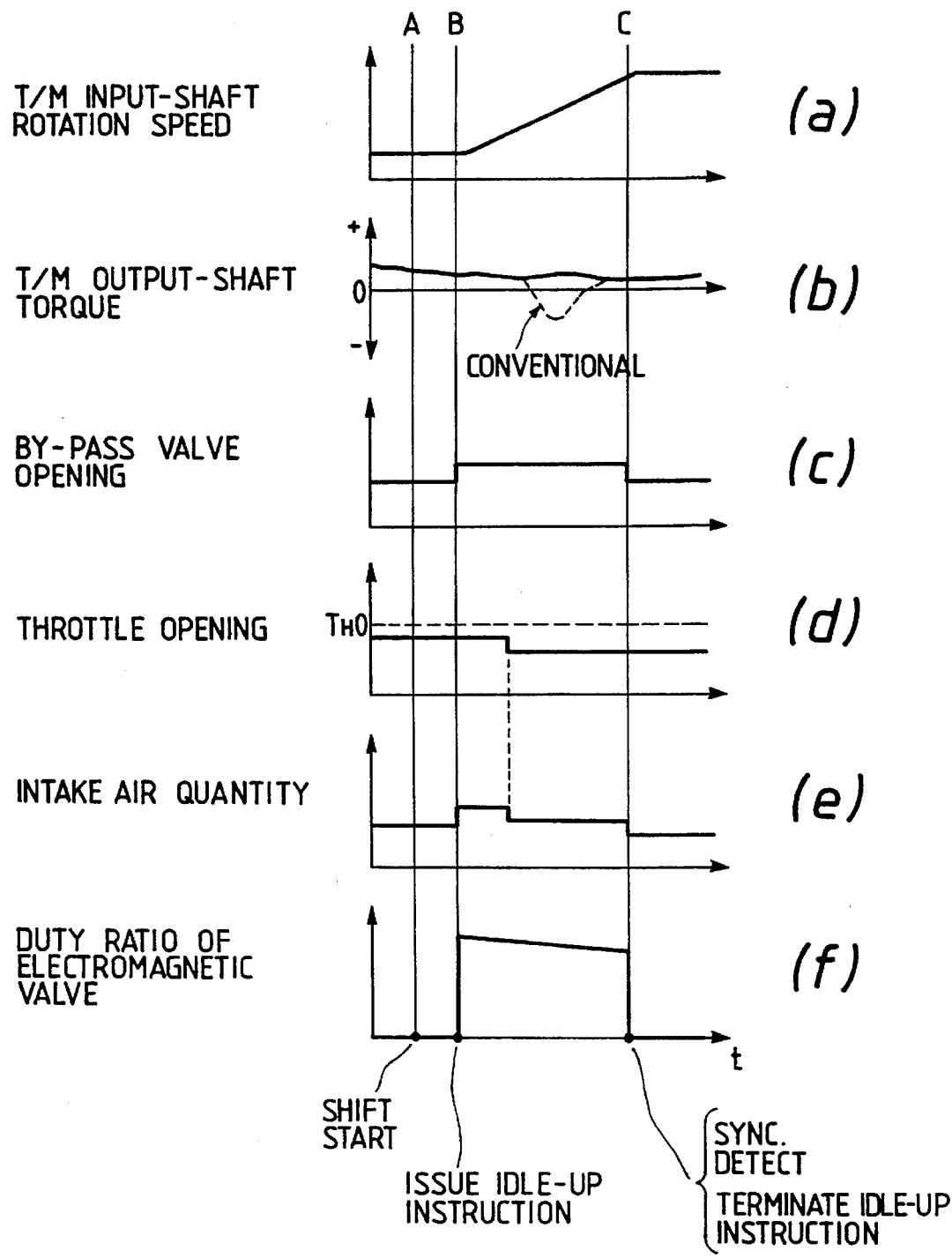

AUTOMATIC TRANSMISSION CONTROL SYSTEM FOR MOTOR VEHICLE

BACKGROUND OF THE INVENTION

The present invention relates to an automatic transmission control system for motor vehicles. More particularly, the invention relates to an automatic transmission control system which can minimize a gear shift shock caused by an accelerator work during the gear shift, without the complexity of the gear shifting operation.

In recent days, a motor car with the automatic transmission for automatically shifting gears depending on a vehicle speed (the rotation speed of the output shaft of the automatic transmission) and the quantity of depression (throttle opening) of the accelerator pedal, has come into common use.

FIG. 11 is a block diagram showing the construction of a conventional automatic transmission control system.

In the figure, reference numeral 1 designates an accelerator pedal; 2, an accelerator opening sensor for detecting a depression amount of the accelerator pedal 1; 3, an accelerator cable, connected to the accelerator pedal 1, for operating a throttle valve; 4, a throttle valve, mounted within an intake pipe 6 connecting to an engine 5, for controlling the quantity of intake air; and 7, a throttle opening sensor for detecting an opening degree of the throttle valve. An automatic transmission 8 is connected to an output-shaft rotation speed detecting means 9 for detecting the rotation speed (corresponding to a vehicle speed) of the output shaft. An input-shaft rotation speed detecting means 10 is used for detecting the rotation speed of the input shaft of the automatic transmission 8. A control unit 11 for controlling the automatic transmission 8 receives signals representative of the rotation speed of the output shaft, the accelerator opening, throttle opening and the like from the output-shaft rotation speed detecting means 9. Reference numeral 12 designates a hydraulic controller for the automatic transmission 8, and 13 is an electromagnetic valve included in the hydraulic controller 12.

Reference numeral 14 designates an injection valve for injecting fuel to the engine 5. A by-pass air path 15 turns aside from the throttle valve 4. A by-pass valve 16 is for controlling the cross sectional area of the by-pass air path 15.

The injection valve 14, the by-pass valve 16 and the like are controlled by the engine electronic control unit 17. The engine electronic control unit 17 receives data signals indicative of temperature of engine cooling water, the quantity of intake air to the engine 5, engine speed, atmospheric pressure, temperature of intake air, and the like, and controls the quantity of injection fuel, ignition timing, by-pass valve timing, and the like. The engine electronic control unit 17 and the transmission control unit 11 are interconnected by means of a transmission line 18 through which data is transferred between them.

A first example of the automatic transmission control using the conventional automatic transmission control system will be described.

A driver steps on the accelerator pedal 1 in accordance with driving conditions. The accelerator pedal 1 and the throttle valve 4 are connected to each other by the accelerator cable 3. The opening of the throttle valve 4 changes in accordance with the quantity of the depression of the accelerator pedal 1.

The transmission electronic control unit 11 makes a decision on the gear change in accordance with the sensor information of the accelerator opening sensor 2 or the throttle opening sensor 7 and the output-shaft rotation speed detecting means, and sends a gear change instruction signal to the automatic transmission 8.

FIG. 12 is a graph showing a variation of the throttle opening and the accelerator opening with respect to time t including the gear shift duration of time.

In the figure, the gear shift duration ranges from a time point A to another time point B. The graph shows a state in which the accelerator pedal is depressed during the gear shift, and as a result, the throttle opening 71 is varied.

A second example of the automatic transmission control using a conventional automatic transmission control system will be described.

Description of the second example is limited to the automatic gear shift control in the down-shift from high to low gear, for ease of explanation.

In the down-shift mode, the automatic transmission control system selectively uses the transmission control depending on a state of the engine, a power-on state or a power-off state.

Here, the term "power-on" means a state in which the engine receives a positive power (for example, when the accelerator pedal is depressed). The term "power-off" means a state in which the engine receives a negative power (for example, when the accelerator pedal is not depressed).

In the power-on state of the engine 5, if the friction engagement elements (e.g., the clutch, brake, and the like of the automatic transmission) engaged into the high gear are disengaged, the rotation speed of the input shaft increases and the input shaft reaches by itself the rotation speed attained after the gear shift. Accordingly, the friction engagement elements are made to engage into the low gear when a detected value detected by input-shaft rotation speed detecting means 10 is equal to that by the output-shaft rotation speed detecting means 9.

In the power-off state of the engine 5, the friction engagement elements engaged into the low gear are disengaged in a manner that the friction engagement elements engaging into the high gear are disengaged to increase the rotation speed of the input shaft of the automatic transmission 8 by the friction engagement elements engaging into the low gear, and when the detected values of the input-shaft and output-shaft rotation speed detecting means 10 and 9 are equal to each other.

When the shift-down from high to low gear in the state of the power-off of the engine 5 is done under the conditions that the vehicle speed is low and the throttle opening is small (immediately before the vehicle stops), it is difficult to minutely control the torque capacity of the friction engagement elements since the engine braking force is small. As a result, a gear shift shock occurs and gear shift time is too short.

Before the down-shift starts immediately before the vehicle stops, if the engine is in the power-on state in the vicinity of the boundary between the power-on and the power off states (FIG. 13), the gear shift proceeds and if the engine speed increases, the engine state frequently changes to the power-off state during the gear shift. This causes a gear-shift shock, called "bumpy motion" of the drive system.

To cope with this problem, Japanese Unexamined Patent Publication (Kokai) Hei-4-91332 discloses a unique technique.

The construction of the automatic transmission control system and its peripheral devices of this publication are basically the same as that shown in FIG. 11. Accordingly, the automatic transmission control for the down-shift of the automatic transmission 8 will be described using the automatic transmission control system of the publication. The description will be given with reference to FIG. 14.

To start with, in a step S1, it is determined whether or not a vehicle speed detected by the output-shaft rotation speed detecting means 9 is equal to or lower than a preset value V0 and a throttle opening detected by the throttle opening sensor 7 is equal to or smaller than a preset value TH0. In this instance, the preset values V0 and TH0 are those values obtained immediately before the vehicle stops.

If the answer to the step S1 is YES, this state of the transmission is recognized as the down-shift immediately before the vehicle stops, and a flag is set to "1".

In a step S3, the hydraulic circuit of the automatic transmission 8 is altered in accordance with the down-shift from high to low gear, independently of the recognition result in the step S1.

In a step S4, it is determined whether or not the flag was set to "1" in the step S2. If it was set to "1", the current state of the automatic transmission is the down-shift just prior to the vehicle stop. Accordingly, an idle-up instruction is issued in a step S5. In response to the instruction, the opening of the by-pass valve 16 is increased to cause the quantity of air flowing through the by-pass air path 15 to increase. The engine is placed to the power-on state.

In a step S6, hydraulic control is done in order to effect the shift-down. Specifically, a duty ratio of the electromagnetic valve 13 of the hydraulic controller 12 is controlled. As the result of the hydraulic control, the friction engagement elements of the automatic transmission 8 is changed from the high gear to the low gear.

In a step S7, it is detected whether or not the input shaft rotation is synchronized with the output shaft rotation by using the input- and output-shaft rotation speed detecting means 10 and 9. If both rotations are synchronized with each other, the control recognizes that the gear shifting operation is completed. In a step S8, it is checked whether the flag is set to "1". If it is "1", the idle-up operation is stopped. The opening of the by-pass valve 16 is reduced to the original one, so that the quantity of the air flowing through the by-pass air path 15 is reduced. In a step S10, the control stops the hydraulic control operation, and in a step S11 resets the flag to "0".

Variations of various parameters in the automatic transmission control as described above are illustrated in (a) to (f) in FIG. 15.

In FIG. 15, (a) shows a variation of the rotation speed of the input shaft; (b), an output shaft torque; (c), an opening of the by-pass valve 16; (d), an opening of the throttle valve 4; (e), the quantity of intake air; and (f), a duty ratio of the electromagnetic valve 13. The axis of abscissa represents time.

In the figure, A represents a gear shift start point, B is a point where the idle-up instruction is issued, and C is a point where the input shaft and the output shaft are synchronized in rotation and also the idle-up instruction end.

In the conventional art, when the gear shift is carried out, the system control recognizes the state of the automatic transmission as the down-shift just prior to the vehicle stop, and the system control issues an idle-up instruction. The engine maintains the power-on state unless the gear shifting operation abnormally proceeds.

Accordingly, in this conventional art, even in the state of the down-shift just prior to the vehicle stop, no gear-shift shock takes place.

The conventional automatic transmission control systems thus constructed and operated, however, have the following problems.

In the first conventional art, even when the accelerator pedal is operated during the gear shift, the throttle opening varies. Accordingly, a degree of the gear shift is altered, even during the gear shift, in accordance with a change of the throttle opening. This alteration makes the gear shift control complicated.

Further, the throttle opening changes depending on the acceleration opening. As a result, output power of the engine changes to cause a gear shift shock.

In the second conventional art (described in Japanese Kokai-Hei-4-91332), the vehicle speed and the throttle opening are smaller than preset values. Even if the quantity of the intake air is increased by the idle-up, the engine is in the power-on state in the vicinity of the boundary between the power-on and power-off states before the gear shift starts. When the throttle opening, as shown in (d) of FIG. 15, is further decreased during the gear shift, the quantity of the intake air to the engine (e) of FIG. 15 also decreases, so that the engine is placed to the power-off state. In this case, the torque of the output shaft of the automatic transmission is varied as indicated by a broken line, not a solid line, in (b) of FIG. 15. This appears as a gear shift shock in the drive system.

In the second conventional art, the idle-up instruction is issued during the gear shift. A time elapses from an instant that the quantity of the intake air increases till the engine output increases. The gear shift proceeds during the course of increasing the engine output to a sufficient value. When the engine is in the power-on state in the vicinity of the power on/off boundary before the gear shift starts, the output shaft torque of the automatic transmission varies as indicated by the broken line in (b) of FIG. 15, causing a gear shift shock.

Additionally, the general automatic transmission control system selects a suitable gear shift control mode depending on a state of the engine. Where a state of the engine changes during the gear shift, a complicated gear shift control is required.

SUMMARY OF THE INVENTION

With the view of solving the above problems, the present invention has an object to simplify the automatic transmission control, reduce a gear shift shock, and improve the driveability.

To achieve the above objects, there is provided an automatic transmission control system having an accelerator pedal, an accelerator opening sensor for detecting the quantity of depression of the accelerator pedal, intake air quantity adjusting means for adjusting the quantity of intake air to the engine, an automatic transmission, output-shaft rotation speed detecting means for detecting the rotation speed of the output shaft of the automatic transmission, and automatic transmission control means for determining a target gear in the automatic transmission on the basis of the rotation speed of the output shaft and a value concerning the quantity of the intake air, the automatic transmission control system characterized by a control means for controlling the intake air quantity adjusting means so as to prohibit the opening of the intake air quantity adjusting means from following the acceleration opening during the gear-shift operation of the automatic transmission control means.

According to another aspect of the present invention, there is provided an automatic transmission control method for vehicles in which a throttle opening of the throttle valve is adjusted in accordance with an acceleration opening of an accelerator pedal and a target gear in the automatic transmission is determined on the basis of the throttle opening and a vehicle speed, the automatic transmission control method characterized in that during the gear shifting operation, the throttle opening is set at a fixed value irrespective of a variation of the acceleration opening, and before and after the gear shifting operation, the throttle opening is varied in accordance with the acceleration opening.

In the automatic transmission control method, during the gear shifting operation, the throttle opening is fixed to a value of opening immediately before the gear shift, irrespective of a variation of the acceleration opening.

Also in the automatic transmission control method, during the gear shifting operation, the throttle opening is varied more gently than the acceleration opening transmission, and before and after the gear shift, the throttle opening is varied in accordance with a rate of change of the acceleration opening.

In the automatic transmission control system for determining a target gear on the basis of a value concerning the quantity of intake air and the rotation speed of the output shaft (vehicle speed) of the automatic transmission, the opening of the intake air quantity adjusting means is prohibited from following the variation of the acceleration opening during the gear shifting operation. Therefore, during the gear shifting operation, the gear is never shifted by the variation of the opening of the intake air quantity adjusting means. The engine output is kept substantially constant during the gear shifting operation. The complexity of the gear shifting control is avoided, and no gear shift shock is caused. This function results also from such a construction for control that the opening of said intake air quantity adjusting means is prohibited from following the acceleration opening when the acceleration opening is reduced during the down-shift operation from high to low gear by said automatic transmission control means under the conditions that the acceleration opening and the rotation speed of the output shaft are below preset values, thereby maintaining the power-on state of the engine.

The useful function is further ensured by fixing the opening of said intake air quantity adjusting means to the opening immediately before the gear shift during the gear shifting operation.

The function can also be realized by varying the opening of said intake air quantity adjusting means more gently than the acceleration opening during the gear shifting operation. Less variation of the opening of the intake air quantity adjusting means is required until after the gear shift. As a result, a shock and unnatural feeling, which are caused by the acceleration after the gear shift, are lessened.

Further, in the automatic transmission control system, said control means for said intake air quantity adjusting means increases the opening of said intake air quantity adjusting means by a preset value of opening in response to an instruction from said automatic transmission control means when the acceleration opening is reduced during the down-shift operation from high to low gear by said automatic transmission control means under the conditions that the acceleration opening and the rotation speed of the output shaft are below preset values. In such a situation, it is possible to actively maintain the power-on state of the engine. Suppression of the gear shift shock can be more reliably ensured.

Also in the automatic transmission control system, the automatic transmission control means instructs said control means for said intake air quantity adjusting means to increase the opening of said intake air quantity adjusting means by a preset value of opening during the down-shift operation under the conditions that the acceleration opening and the rotation speed of the output shaft are below preset values, and starts the gear shifting operation after the engine output is changed in response to the instruction from said automatic transmission control means. Therefore, the gear shifting operation is carried out during the period from the increase of the opening till the engine output changes, whereby during this period, the engine state is never changed to the power-off state.

Additionally, in an automatic transmission control method for vehicles in which a target gear in the automatic transmission is determined on the basis of the throttle opening and a vehicle speed, the throttle opening is set fixed value irrespective of a variation of the acceleration opening. Therefore, during the gear shifting operation, the gear is never shifted by a variation of the throttle opening. The engine output during the gear shifting operation is kept almost constant, possibly causing the gear shift shock.

This function is further ensured by fixing the throttle opening to a value of opening immediately before the gear shift. The function is ensured by varying the throttle opening more gently than the acceleration opening transmission. Less variation of the throttle opening is required until after the gear shift. As a result, a shock and unnatural feeling, which are caused by the acceleration after the gear shift, are lessened.

BRIEF DESCRIPTION OF THE DRAWINGS

FIG. 3 is a flowchart showing the operation of the automatic transmission control system according to a first embodiment of the present invention;

FIG. 15 is a set of graphs showing variations of various control parameters in the automatic transmission control by the conventional system.

DETAILED DESCRIPTION OF THE PREFERRED EMBODIMENTS

EMBODIMENT 1

Figure 1:
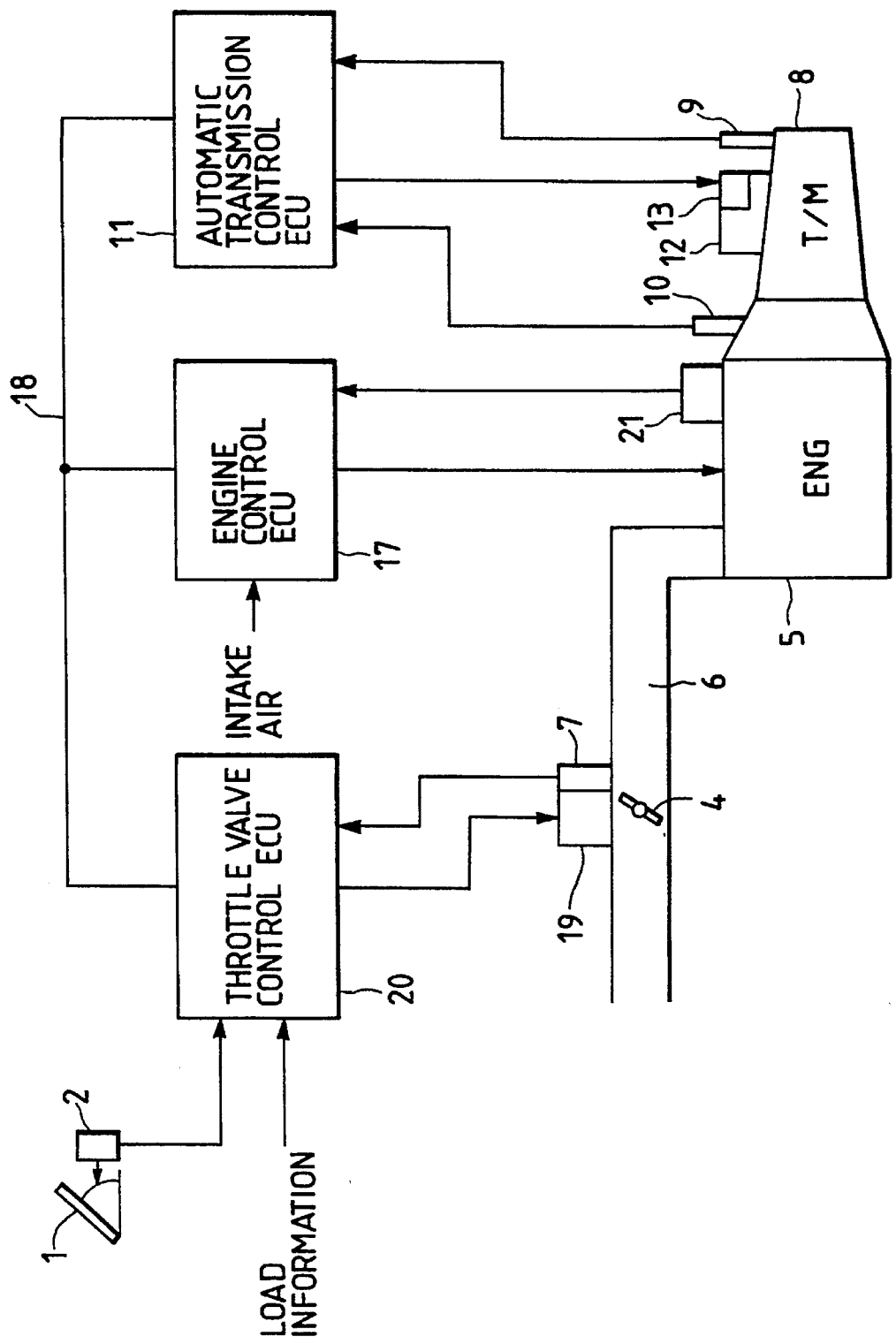
FIG. 1 is a diagram showing the construction of an automatic transmission control system according to the present invention.

In FIG. 1 showing an automatic transmission control system incorporating the present invention, reference numeral 1 designates an accelerator pedal; 2, an accelerator opening sensor for measuring the quantity of depression of the accelerator pedal; 4, a throttle valve as an intake air quantity adjusting means, mounted within an intake pipe 6, for controlling the quantity of intake air; 19, a throttle actuator for adjusting an opening of the throttle valve 4; and 7, a throttle opening sensor for measuring an opening of the throttle valve. A throttle valve electronic control unit 20 as a control means for the intake air quantity adjusting means receives signals from the accelerator opening sensor 2 and the throttle opening sensor 7, and controls the throttle actuator 19 in accordance with the signals received. The throttle valve electronic control unit 20 also receives load information, such as the air conditioner, power steering, and water temperature. When a large load is present, the opening of the throttle valve 4 is increased, thereby increasing the idling speed of the engine.

Reference numeral 8 designates an automatic transmission; 9, an output-shaft rotation speed detecting means for detecting the rotation speed (corresponding to a car speed) of the output shaft. An input-shaft rotation speed detecting means 10 is used for detecting the rotation speed of the input shaft of the automatic transmission 8. Reference numeral 12 designates a hydraulic controller for controlling the friction engagement elements of the automatic transmission 8. Reference numeral 13 designates an electromagnetic valve for the hydraulic controller. Reference numeral 11 designates a transmission electronic control unit for controlling the automatic transmission 8.

Numeral 21 represents a crank angle detecting means for detecting the engine speed. An engine electronic control unit 17 receives signals representative of the quantity of intake air, atmospheric pressure and the like, and controls fuel injection timings of the engine 5.

The control units are interconnected by means of a transmission line 18.

Figure 2:
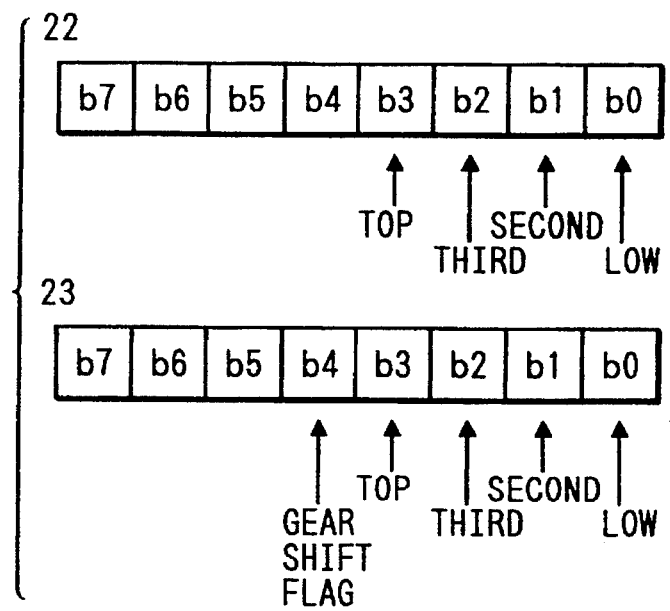
FIG. 2 is a diagram showing exemplary bit codings of transmission data handled in the automatic transmission control system according to the present invention.

FIG. 2 shows a diagram showing bit codings of transmission data of the transmission electronic control unit 11. In the figure, reference numerals 22 and 23 are transmission data, and examples of bit codings thereof. Numeral 22 indicates data representative of the present gear of the automatic transmission 8. During the running of the vehicle, any of the bits of the low to top gears is set. Reference numeral 23 indicates data representative of a target gear during the gear shifting operation. When the gear shift starts, an under-gear-shift flag and a target gear bit are set.

The automatic gear shift control by the automatic transmission control system will be described.

The throttle valve electronic control unit 20 periodically transfers the data derived from the throttle opening sensor 7 and the accelerator opening sensor 2 onto the transmission line 18.

The transmission electronic control unit 11 judges the gear shift by the accelerator opening data and throttle opening data derived from the throttle valve electronic control unit 20, and the output shaft rotation data from the output-shaft rotation speed detecting means 9. The same periodically sends present gear data 22 and target gear data 23 to the transmission line 18.

The operation of the transmission electronic control unit 11 will be described referring to a flowchart of FIG. 3.

In a step 301, it is determined whether or not the automatic transmission 8 is under gear shift. If it is not under gear shift, the control unit acquires throttle opening data (step 302), acceleration opening data (step 303), and vehicle speed (step 304), i.e., the output shaft rotations.

In a step S305, it is determined whether or not the gear shift is needed. If it is not needed, the control unit ends its transmission control.

If the gear shift is needed, the control unit sets a target gear in the target gear data 23 in a step 306 and sets an under-gear-shift flag.

If the answer to the decision diamond of step 301 is YES, viz., the automatic transmission is under gear shift, the transmission electronic control unit controls the gear shifting operation of the automatic transmission 8 in a step 308. In a step 309, it is judged whether or not the gear shifting operation is completed. If the gear shift is not completed, the control unit goes out of this routine. If the gear shift is completed, the control unit sets a new gear to the present gear data 22 (step S310). In a step S311, the control unit clears the under-gear-shift flag of the target gear data 23, and goes out of this routine.

Figure 4:
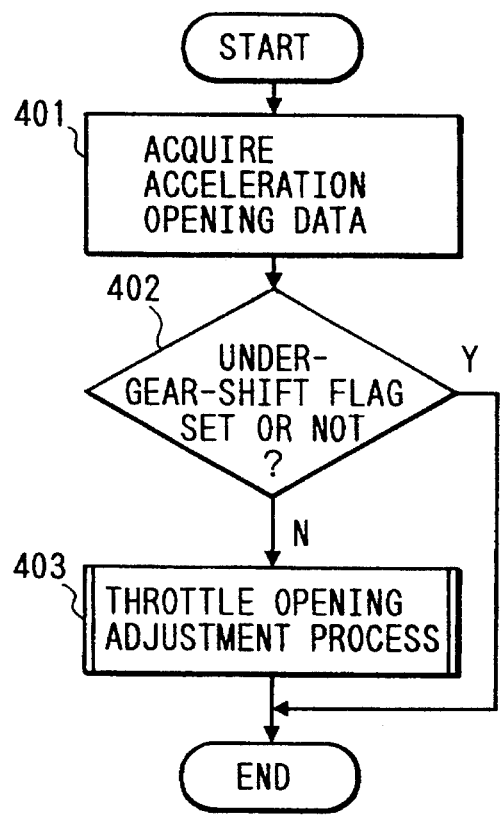
FIG. 4 is a flowchart showing the operation of a throttle valve electronic control unit (control unit for the intake air quantity adjusting means) in the automatic transmission control system according to the first embodiment of the present invention.

The throttle opening control by the throttle valve electronic control unit 20 will be described referring to a flowchart of FIG. 4.

In a step 401, the throttle valve electronic control unit acquires accelerator opening data. In a step 402, the control unit checks a state of the under-gear-shift flag of the target gear data 23. If the flag shows that the automatic transmission is not under gear shift, the control unit, in a step 403, sends a signal indicative of adjusting the throttle opening to the throttle actuator 19 on the basis of the accelerator opening data. If the automatic transmission is under gear shift, the control unit goes out of the routine, irrespective of a variation of the accelerator opening, and sets the throttle opening to a preset value or the opening before the gear-shift. Thus, the throttle opening is prevented from following the acceleration opening.

Figure 5:
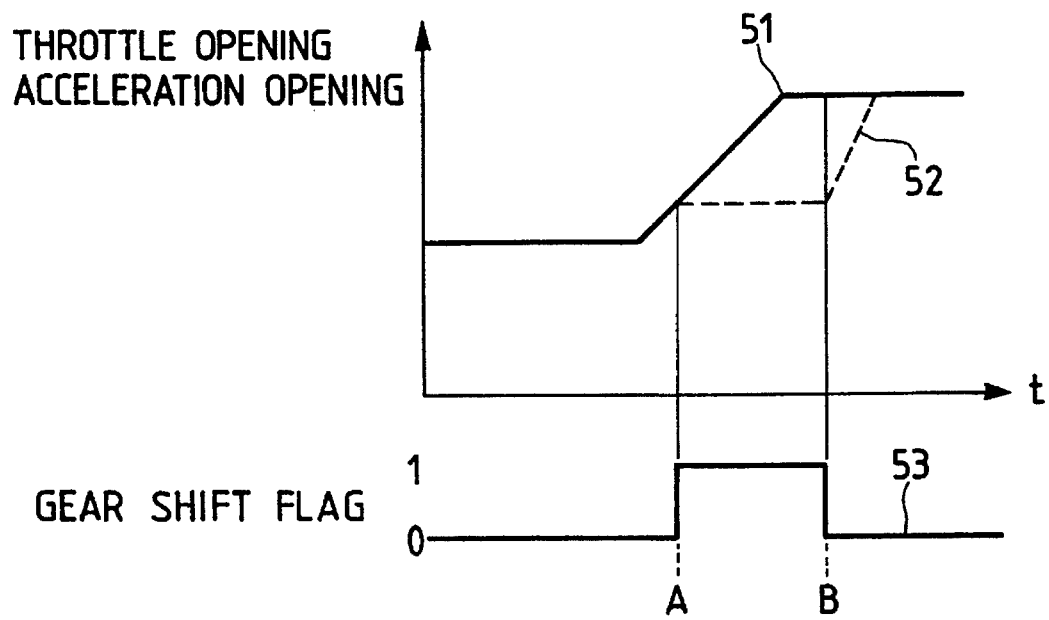
FIG. 5 is a graphical representation of the relationship between the throttle opening (opening of the intake air quantity adjusting means) and the acceleration opening, and an under-gear-shift flag, which is used in the automatic transmission control system according to the first embodiment of the present invention.

The relationship between the gear-shift control by the transmission electronic control unit 11 and the operation of the throttle valve electronic control unit 20 may be depicted as shown in FIG. 5.

In the graph, the ordinate represents a degree of the acceleration opening and a degree of the throttle opening, and the abscissa represents time t.

In the figure, reference numeral 51 designates an acceleration opening; 52, a throttle opening; and 53, a state of the under-gear-shift flag in the present gear data 22. When the flag is "1", the automatic transmission is under-gear-shift.

Description of the graph proceeds along the time axis. During a period from the starting point to a time point A, the under-gear-shift flag is cleared. Accordingly, the throttle opening 52 is controlled in accordance with the acceleration opening.

During a period from the time point B to a time point A, the under-gear-shift flag is set. The throttle opening 52 is invariable if the acceleration opening 51 varies. The throttle opening is kept at the opening just before the under-gear-shift flag is set.

At the time point B, the gear shifting operation ends. When the under-gear-shift flag is cleared, the throttle opening 52 is varied up to a value depending on the acceleration opening 51 at that time.

Thus, during the gear shifting operation, if the quantity of depression of the accelerator pedal 1 changes, the throttle opening 52 is left invariable. For this reason, in the automatic transmission 8 using the throttle opening as one of the parameters for the automatic gear shift control, there is eliminated the complexity of the gear shifting control, which results from a change of the throttle opening during the gear shift. Further, the throttle opening is kept constant, so that the engine output is also kept almost constant, causing no gear shift shock.

EMBODIMENT 2

Figure 6:
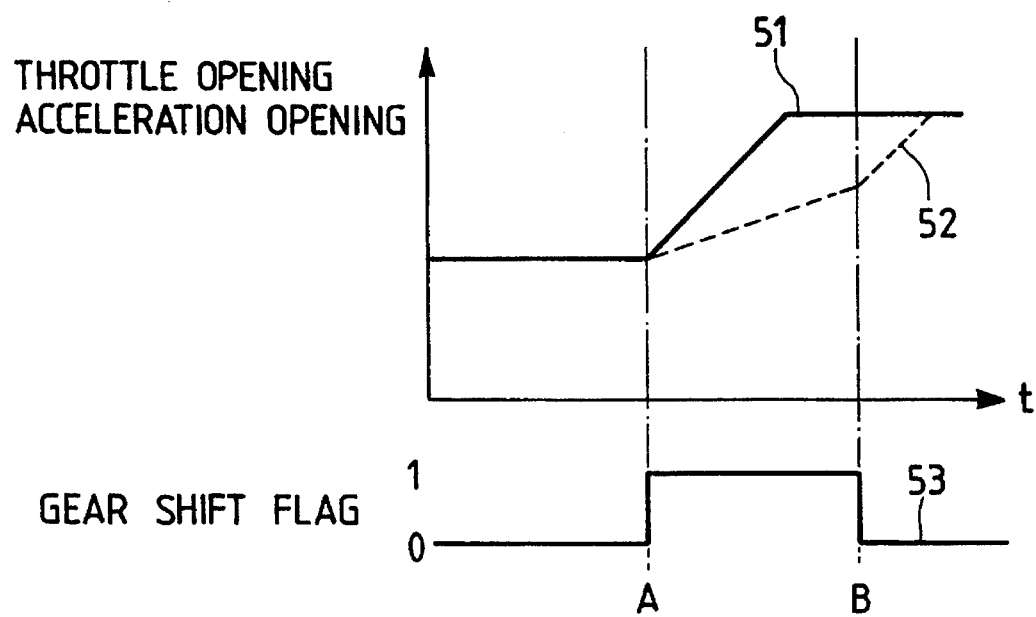
FIG. 6 is a graphical representation of the relationship between the throttle opening (opening of the intake air quantity adjusting means) and the acceleration opening, and an under-gear-shift flag, which is used in the automatic transmission control system according to the second embodiment of the present invention.

In the embodiment 1 as described above, the throttle opening during the gear shifting operation is fixed at the opening just before the under-gear-shift flag is set. In this embodiment, the throttle opening is gently varied during the gear shifting operation as shown in FIG. 6, in order to reduce the time taken for the throttle opening 52 to reach a value based on the acceleration opening 51 after the gear shifting operation ends. In this case, a rate of change of the throttle opening is smaller than that of the acceleration opening 51.

Also in this embodiment, the throttle opening varies more gently than the acceleration opening. Accordingly, a sudden change of the engine output does not take place, whereby the gear shift shock is lessened.

Additionally, the difference between the acceleration opening and the throttle opening is small at the end of the gear shifting operation. Therefore, when the throttle opening follows the acceleration opening after the end of the gear shifting operation, the throttle opening relatively gently changes. The throttle opening change will not cause any shock or unnatural feeling.

EMBODIMENT 3

Figure 7:
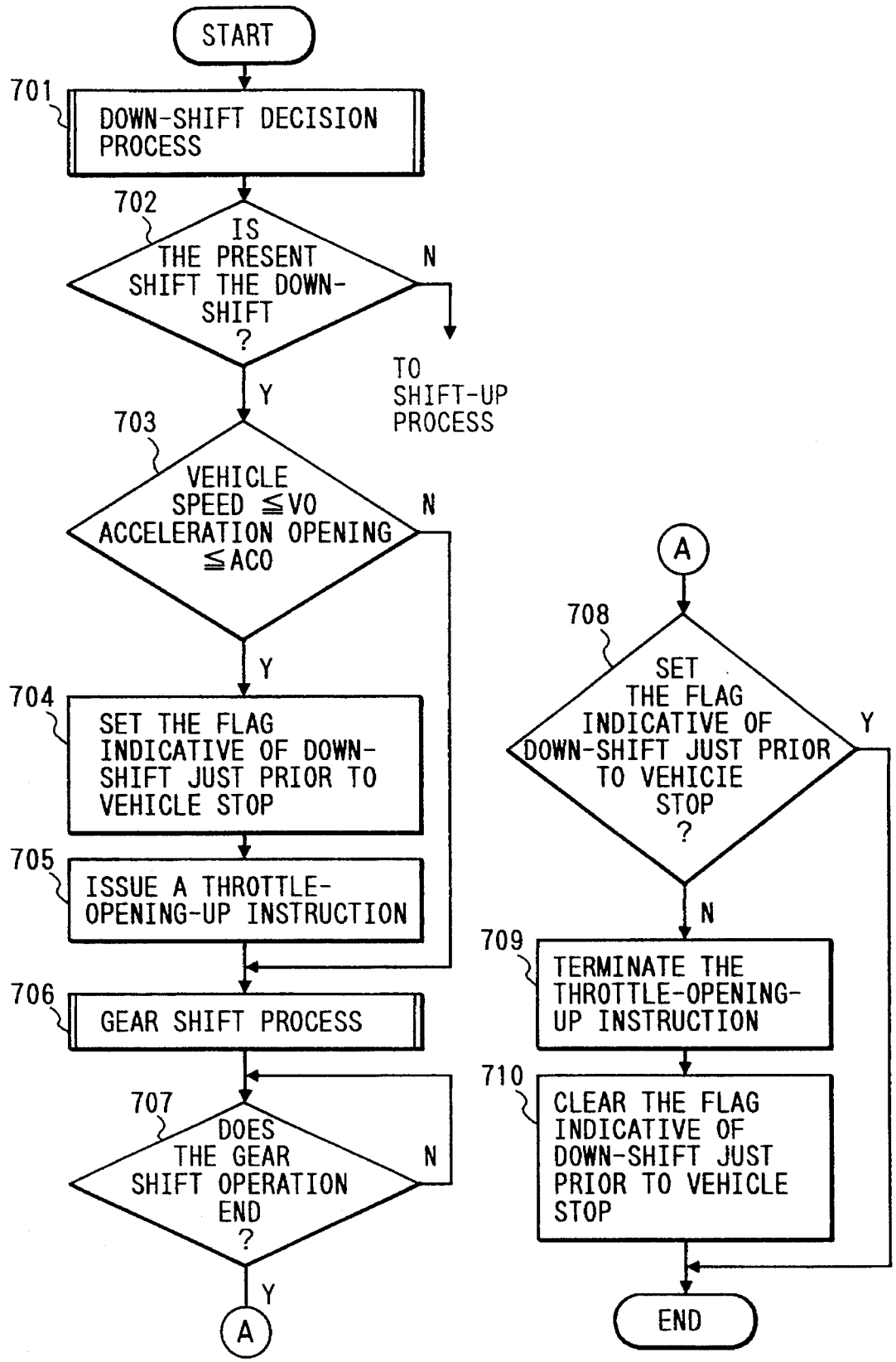
FIG. 7 is a flowchart showing the operation of the automatic transmission control system according to the second embodiment of the present invention.

In the description of the embodiments 1 and 2, the typical cases where the throttle opening is prohibited from following the change of the acceleration opening are discussed. The embodiment 3 is suitable for the down-shift just prior to the vehicle stop. This will be described with reference to FIG. 7.

In a step 701, it is determined whether or not the present shifting operation is the down-shift on the basis of the opening of the throttle valve 4 the vehicle speed of the output-shaft rotation speed detecting means 9. In a step 702, it is determined whether or not the conditions of the down-shift are satisfied and the down-shift is performed. If the down-shift is not performed, the control unit checks if the up-shift is performed.

In a step 703, it is determined whether the vehicle speed is V0 or less and the accelerator opening is a preset value AC0 or less.

If the answer to the step 703 is NO, the process proceeds to a step 706. In this step, the control unit carries out the normal gear shift. In this case, the opening of the throttle valve 4 may follow the change of the acceleration opening.

If the answer to the step 703 is YES, a flag representative of the down shift immediately before the vehicle stops is set.

In a step 705, the transmission electronic control unit 11 sends an instruction indicative of throttle-opening-up to the throttle valve electronic control unit 20. As a result, the throttle opening is increased by a given value, and the quantity of the intake air for the engine 5 is increased.

The throttle valve electronic control unit 20 prohibits the throttle opening from following the opening of the throttle valve 4 even if the acceleration opening, which was below the preset value AC0 before the gear shift starts, is reduced during the gear shifting operation.

In a step 706, the process of shifting from high to low gear is carried out by the hydraulic controller 12.

In a step 707, it is determined whether or not the rotation speed of the input-shaft rotation speed detecting means 10 synchronizes to that of the output-shaft rotation speed detecting means 9 in the automatic transmission 8. If the rotation speeds do not synchronize, the gear shift process is continued.

If the rotation speeds synchronize, the control unit advances to a step 708. In this step, it is judged whether the flag of the down shift just prior to the vehicle stop is set or not. If the answer is NO, the automatic gear shift control process is terminated. If the answer is YES, the control unit proceeds to a step 709, the transmission electronic control unit 11 instructs the throttle valve electronic control unit 20 to terminate the throttle-opening-up instruction. The throttle opening is set to a value based on the present acceleration opening, thereby reducing the quantity of the intake air to the engine. In a step 710, the flag indicative of the down shift just prior to the vehicle stop is cleared, to complete the sequence of automatic gear shift control steps.

Figure 8:
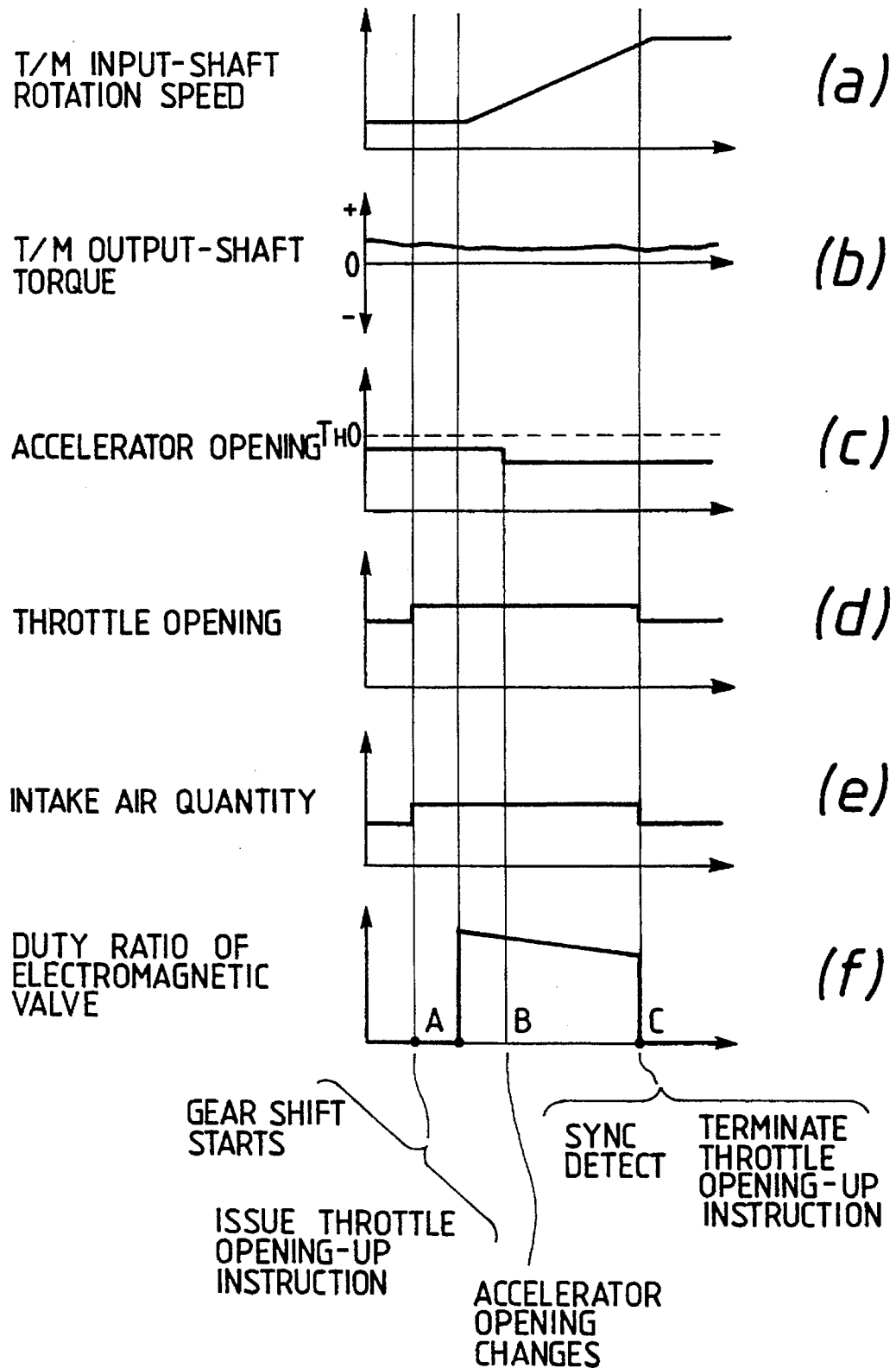
FIG. 8 is a set of graphs showing variations of various control parameters in the automatic transmission control system according to the third embodiment of the invention.

The control parameters during the gear shifting operation are shown in FIG. 8.

In FIG. 8, (a) shows a variation of the rotation speed of the input shaft; (b), an output shaft torque; (c), acceleration opening; (d), an opening of the throttle valve 4; (e), the quantity of intake air; and (f), a duty ratio of the electromagnetic valve 13 of the hydraulic controller 12. The axis of abscissa represents time.

A represents a gear shift start point and the point where the throttle-opening-up is instructed, B represents a time point where the acceleration opening is reduced during the gear shifting operation, C indicates a point where the synchronization of the input shaft rotation with the output shaft rotation of the automatic transmission 8 is detected and the instruction of the throttle-opening-up is terminated.

In this embodiment, at the gear shift start point, the output shaft torque represents the power-on state of the power-on/ power-off boundary. In this state, when the transmission operation enters the gear shift mode to drive the electromagnetic valve 13 of the hydraulic controller 12, the opening of the throttle valve 4 is increased, thereby increasing the quantity of the intake air. During the course of shifting from high to low gear by increasing the duty ratio of the electromagnetic valve 13 to a preset value, even if the acceleration opening is decreased from the original value of the opening, the throttle valve opening is prevented to change following the decrease of the acceleration opening. As shown in (b) of FIG. 8, the output shaft torque is positive and the engine maintains the power-on state. Therefore, the gear shift shock is not caused.

EMBODIMENT 4

In the embodiment 3, the throttle valve up instruction is issued for transfer to the throttle valve electronic control unit 20 simultaneously with the judgement whether the downshift just prior to the vehicle stop. A time elapses from increase of the throttle opening till the quantity of the intake air to the engine 5 and the engine output increases. Therefore, if the gear shift proceeds during the course of increasing the engine output to a sufficient value, a state of the engine changes, possibly causing a shock.

Figure 9:
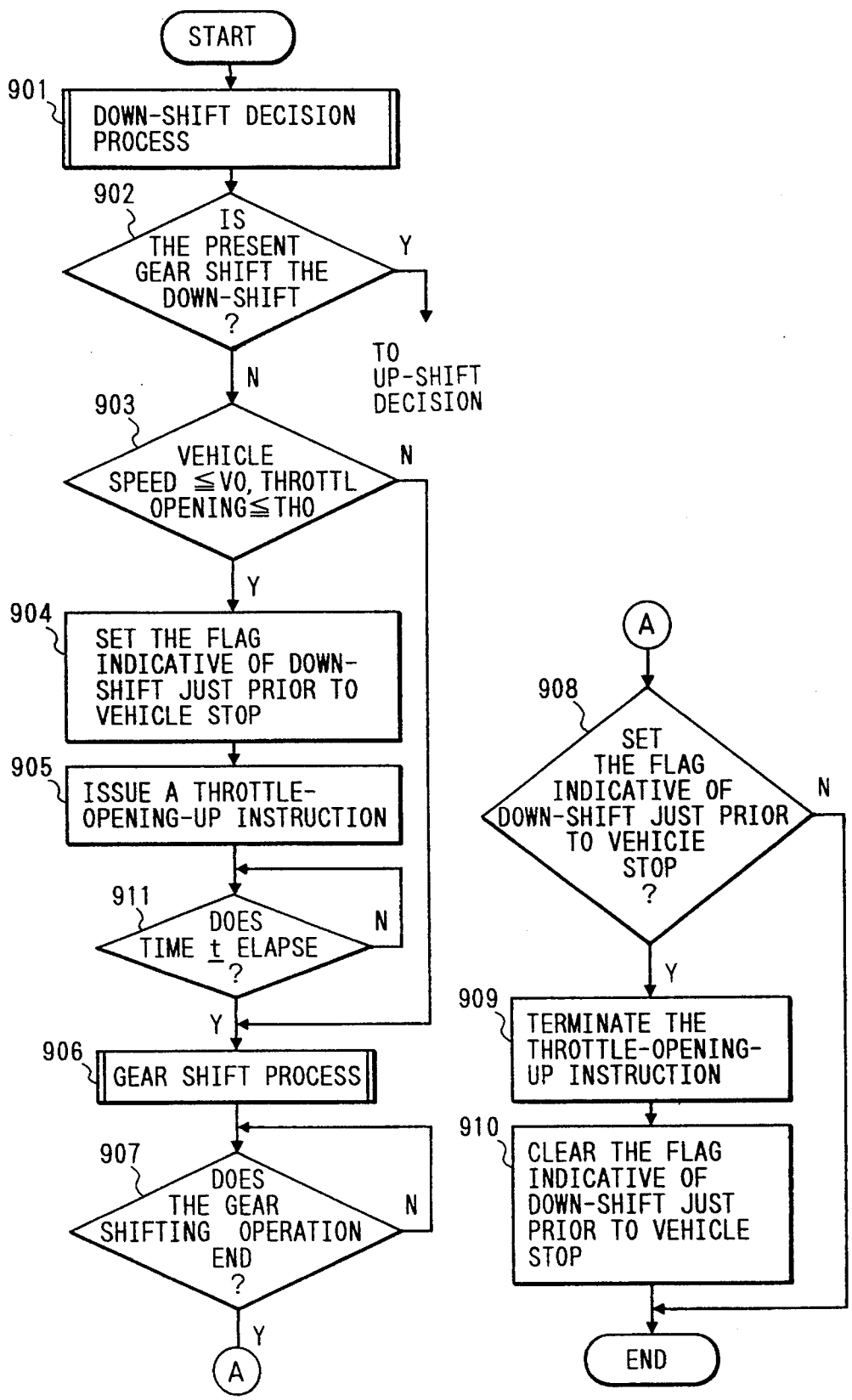
FIG. 9 is a flowchart showing the operation of an automatic transmission control system according to a fourth embodiment of the present invention.

To cope with this, such a transmission control as described by a flowchart of FIG. 9 may be employed.

The description of the flowchart of FIG. 9 will be given emphasizing the different portions from the flowchart of the embodiment 3. After the recognition of the down-shift just prior to the vehicle stop, the transmission electronic control unit 11 sends a throttle-opening-up instruction to the throttle valve electronic control unit 20, in a step 905. At this time, the throttle valve electronic control unit 20 increases the opening of the throttle valve 4 by a preset value of opening.

In a step 911, the control unit checks if a time t, from the increase of the throttle opening till the output of the engine 5 reaches a sufficient value, elapses. After the lapse of the time t, the gear shift process is carried out in a step 906.

Figure 10:
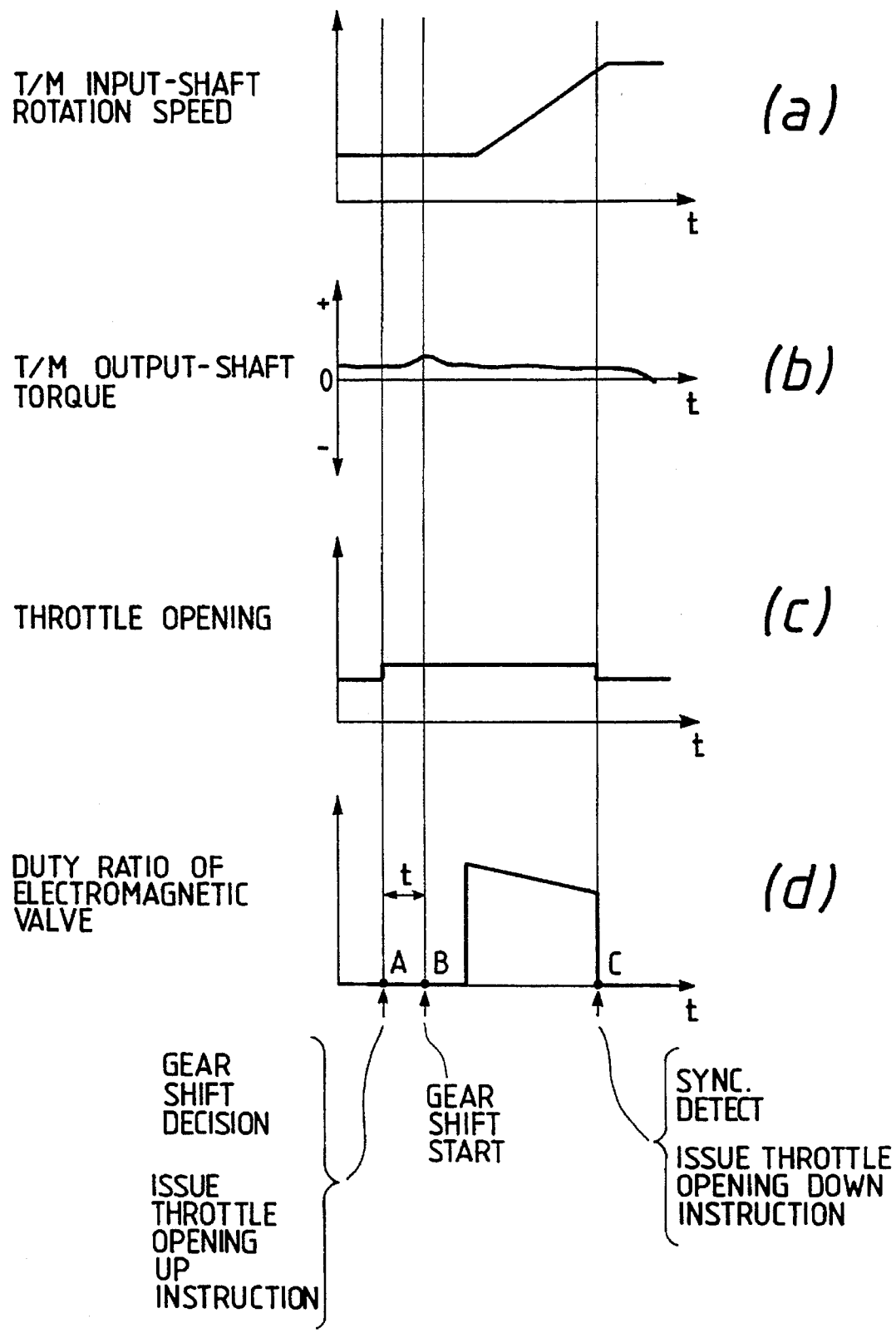
FIG. 10 is a set of graphs showing variations of various control parameters in the automatic transmission control system according to the fourth embodiment of the invention.
Figure 11:
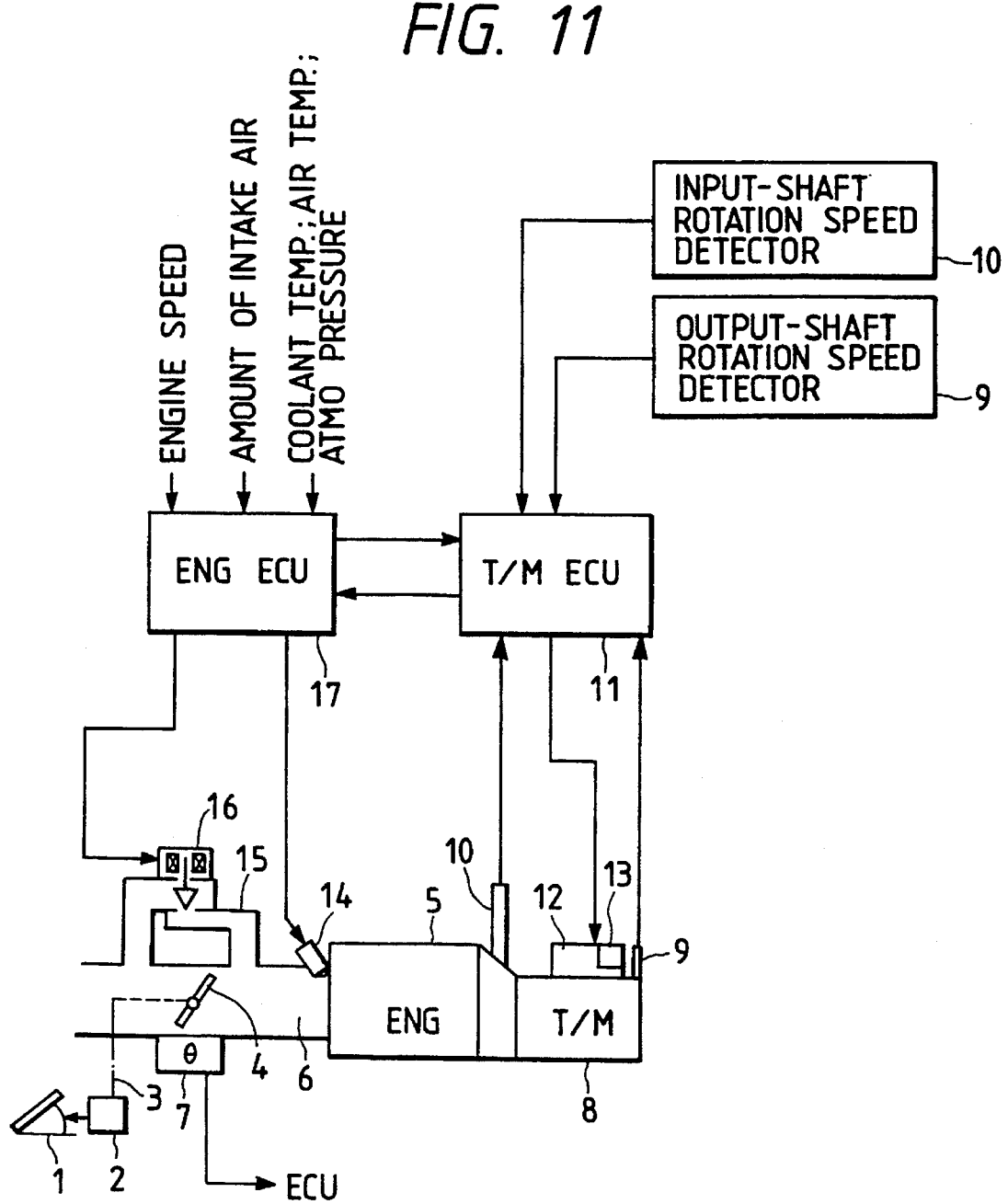
FIG. 11 is a block diagram showing the construction of a conventional automatic transmission control system.
Figure 12:
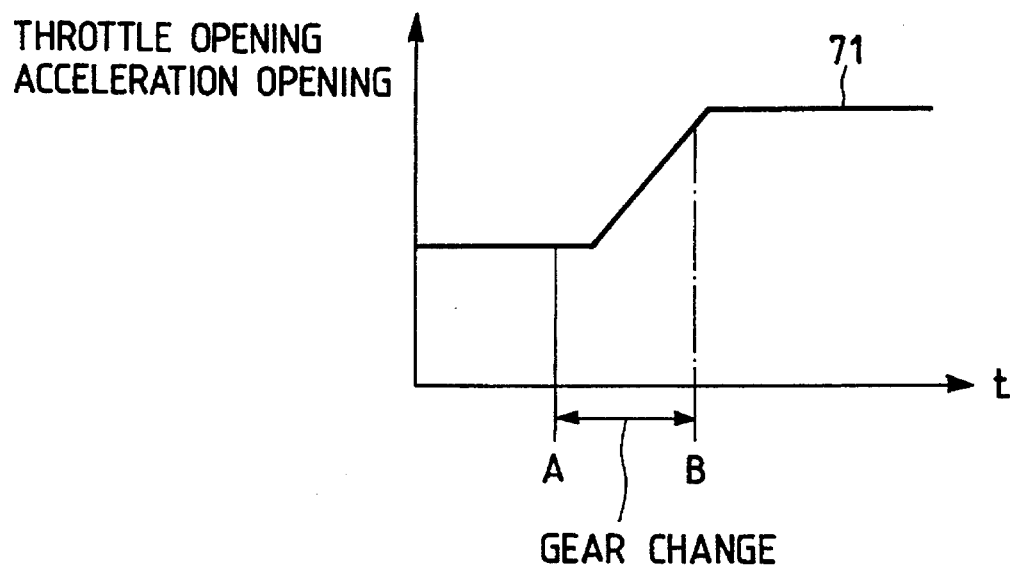
FIG. 12 is a graph showing the relationship of the throttle opening and the accelerator opening with respect to a flag indicative of an under-gear-shift-state.
Figure 13:
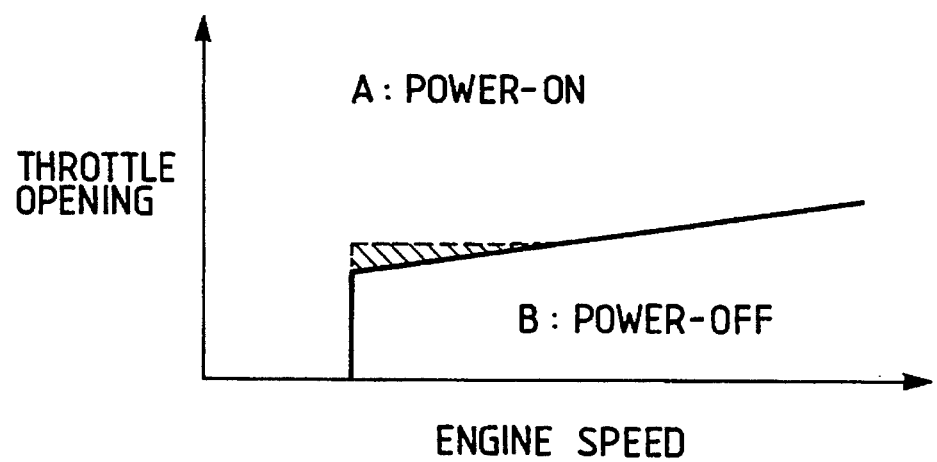
FIG. 13 is a set of graphs showing power-on and power-off areas defined by a throttle opening and engine speed.
Figure 14:
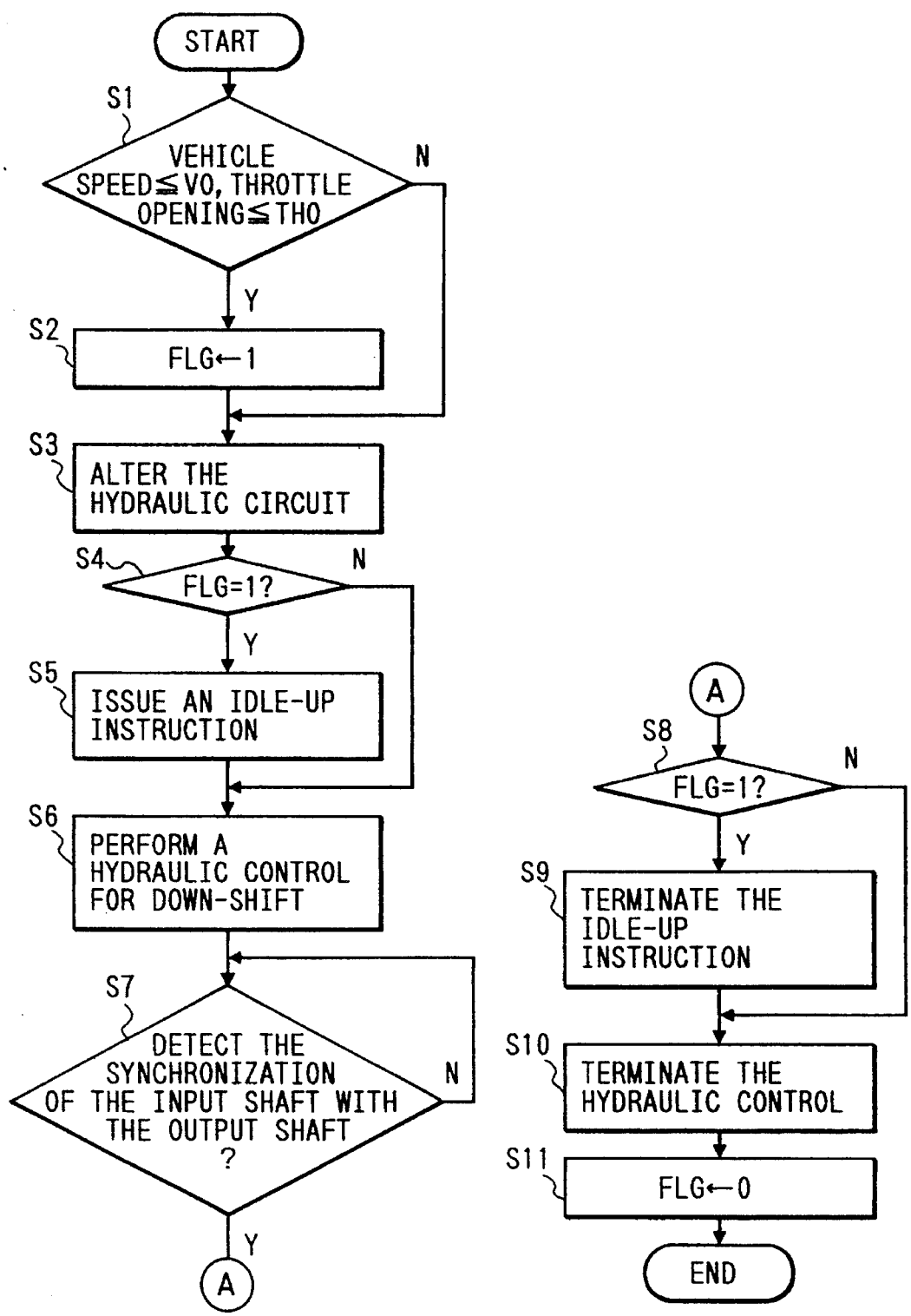
FIG. 14 is a flowchart showing a down-shift process by a conventional automatic transmission control system.

The variations of the control parameters used in the embodiment 4 are shown in FIG. 10. In this figure, the graphs showing variations of the acceleration opening and the quantity of intake air, which are illustrated in the figure used for describing the embodiment 3, are omitted. The parameters vary as those in the embodiment 3. The graphical representations of the illustrated parameters are same those in the embodiment 3, but in this embodiment, the throttle-opening-up instruction is issued when the gear shift decision is made. After a preset time t elapses from the time the throttle-opening-up starts, the gear shift starts at a time point B (step 906 in FIG. 9). During this period t of time, the engine output is sufficiently increased as the result of the increasing variation of the opening of the throttle valve 4.

In the embodiment 4, the change of the engine output is judged by the lapse of time. Engine load information, such as the volumetric efficiency, may be used for the same purpose, in lieu of the time lapse.

In the embodiments 3 and 4, the throttle-opening-up instruction is issued after the gear shift. Alternatively, in an anticipation of gear shift in near future, the throttle-opening-up is previously instructed to increase the engine output. Thereafter, the gear shift decision is made. On the basis of the gear shift decision, the gear shift process is quickly carried out.

In the embodiments as mentioned above, the throttle valve provided in the intake pipe is used for the means to adjust the values concerning the quantity of intake air. Any other means, if it can control the engine output, may be used in lieu of the throttle valve. A by-pass valve, for example, may be used for controlling the flow rate of the intake air.

While the throttle opening is set to a fixed value during the gear shifting operation in the embodiments 3 to 5, it may be varied independently of the variation of the acceleration opening.

As described above, in an automatic transmission control system having an accelerator pedal, an accelerator opening sensor for detecting the quantity of depression of the accelerator pedal, intake air quantity adjusting means for adjusting the quantity of intake air to the engine, an automatic transmission, output-shaft rotation speed detecting means for detecting the rotation speed of the output shaft of the automatic transmission, and automatic transmission control means for determining a target gear in the automatic transmission on the basis of the rotation speed of the output shaft and a value concerning the quantity of the intake air, a control means controls the intake air quantity adjusting means so as to prohibit the opening of the intake air quantity adjusting means from following the acceleration opening during the gear-shift operation of the automatic transmission control means. Therefore, during the gear shifting operation, the opening of the intake air quantity adjusting means is invariable, and hence the gear is never shifted by the variation of the opening of the intake air quantity adjusting means. The complexity of the gear shifting control is avoided, and the engine output is kept substantially constant during the gear shifting operation. No gear shift shock is caused and the driveability is improved.

The reduction of the quantity of the intake air owing to the decrease of the acceleration opening is prevented in the down-shift just prior to the vehicle stop. The power-on state of the engine is maintained during the gear shift, thereby preventing the gear shift shock peculiar to the down-shift just prior to the vehicle stop.

This useful function is further ensured by fixing the opening of said intake air quantity adjusting means to the opening immediately before the gear shift during the gear shifting operation.

The function is ensured by varying the throttle opening more gently than the acceleration opening transmission. Less variation of the throttle opening is required until after the gear shift. As a result, a shock and unnatural feeling, which are caused by the acceleration after the gear shift, are lessened.

Further, the opening of said intake air quantity adjusting means is increased by a preset value of opening in response to an instruction from said automatic transmission control means. Therefore, the engine can reliably be placed to the power-on state in the down-shift immediately before the vehicle stops. This contributes to the prevention of the gear shift shock.

The automatic transmission control means instructs said control means for said intake air quantity adjusting means to increase the opening of said intake air quantity adjusting means by a preset value of opening during the down-shift operation under the conditions that the acceleration opening and the rotation speed of the output shaft are below preset values, and starts the gear shifting operation after the engine output is changed in response to the instruction from said automatic transmission control means. Accordingly, a further reliable prevention of the gear shift shock is ensured.

What is claimed is:

1. An automatic transmission control system comprising:

an accelerator pedal;

an accelerator opening sensor for detecting a quantity of depression of the accelerator pedal;

intake air quantity adjusting means for adjusting a quantity of intake air to an engine;

an automatic transmission;

output-shaft rotation speed detecting means for detecting a rotation speed of an output shaft of the automatic transmission;

automatic transmission control means for determining a target gear in the automatic transmission based on the rotation speed of the output shaft and the quantity of the intake air; and control means for controlling said intake air quantity adjusting means so as to prohibit an opening of said intake air quantity adjusting means from following an acceleration opening during a gear-shift operation of said automatic transmission control means.

2. The automatic transmission control system according to claim 1, wherein said control means for controlling said intake air quantity adjusting means operates to fix the opening of said intake air quantity adjusting means to an opening immediately before a gear shift during the gear-shift operation of said automatic transmission, irrespective of a variation of the acceleration opening.

3. The automatic transmission control system according to claim 1, wherein said control means for controlling said intake air quantity adjusting means operates to vary the opening of said intake air quantity adjusting means more slowly than the acceleration opening during the gear-shift operation of said automatic transmission, and to vary the opening of said intake air quantity adjusting means in accordance with a rate of change of the acceleration opening before and after the gear-shift operation.

4. The automatic transmission control system according to claim 1, wherein said control means for controlling said intake air quantity adjusting means prohibits the opening of said intake air quantity adjusting means from following the acceleration opening when the acceleration opening is reduced during a down-shift operation from high to low gear by said automatic transmission control means under a condition that the acceleration opening and the rotation speed of the output shaft are below preset values.

5. The automatic transmission control system according to claim 4, wherein said control means for controlling said intake air quantity adjusting means increases the opening of said intake air quantity adjusting means by a preset value of opening in response to an instruction from said automatic transmission control means when the acceleration opening is reduced during the down-shift operation from the high to low gear by said automatic transmission control means under the condition that the acceleration opening and the rotation speed of the output shaft are below preset values.

6. The automatic transmission control system according to claim 5, wherein said automatic transmission control means instructs said control means for controlling said intake air quantity adjusting means to increase the opening of said intake air quantity adjusting means by a preset value of opening during the down-shift operation under the condition that the acceleration opening and the rotation speed of the output shaft are below preset values, and starts the gear-shift operation after an engine output is changed in response to the instruction from said automatic transmission control means.

7. An automatic transmission control method for vehicles comprising the steps of:

adjusting a throttle opening of a throttle valve in accordance with an acceleration opening of an accelerator pedal;

determining a target gear in an automatic transmission based on the throttle opening and a vehicle speed;

maintaining the throttle opening at a fixed value during a gear shifting operation irrespective of a variation of the acceleration opening; and controlling the throttle opening in accordance with the acceleration opening before and after the gear shifting operation.

8. The automatic transmission control method according to claim 7, wherein the fixed value is a value of the throttle opening immediately before the gear shift.

9. The automatic transmission control method according to claim 7, wherein during the gear shifting operation, the throttle opening is varied more slowly than the acceleration opening wherein, and before and after the gear shift, the throttle opening is varied in accordance with a rate of change of the acceleration opening.

\* \* \* \* \*